(12) United States Patent
Ciattaglia et al.

(10) Patent No.: US 10,695,712 B2
(45) Date of Patent: Jun. 30, 2020

(54) PROCESS AND APPARATUS FOR SCRUBBING MEDIUM REGENERATION IN A PHYSICAL GAS SCRUB

(71) Applicant: LINDE AKTIENGESELLSCHAFT, Munich (DE)

(72) Inventors: Ilaria Ciattaglia, Munich (DE); Alexander Brandl, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 804 days.

(21) Appl. No.: 14/967,925

(22) Filed: Dec. 14, 2015

(65) Prior Publication Data

US 2016/0175762 A1 Jun. 23, 2016

(30) Foreign Application Priority Data

Dec. 17, 2014 (DE) .................. 10 2014 018 844

(51) Int. Cl.
*B01D 53/14* (2006.01)
*B01D 19/00* (2006.01)

(52) U.S. Cl.
CPC ..... *B01D 53/1425* (2013.01); *B01D 19/0005* (2013.01); *B01D 19/0015* (2013.01); *B01D 19/0036* (2013.01); *B01D 53/1462* (2013.01)

(58) Field of Classification Search
CPC ............ B01D 19/0005; B01D 19/0015; B01D 19/0036; B01D 53/1425; B01D 53/1462; B01D 53/1475; B01D 53/1468
See application file for complete search history.

(56) References Cited

U.S. PATENT DOCUMENTS

| | | | | | |
|---|---|---|---|---|---|
| 3,935,188 | A | * | 1/1976 | Karwat ................. | B01D 53/54 423/226 |
| 4,324,567 | A | * | 4/1982 | Ranke ................... | B01D 53/14 95/161 |
| 4,609,384 | A | * | 9/1986 | Ranke ............... | B01D 53/1462 95/246 |
| 4,702,898 | A | * | 10/1987 | Grover ................. | B01D 53/14 423/220 |
| 4,834,781 | A | * | 5/1989 | Grunewald ........ | B01D 53/1475 95/163 |

(Continued)

FOREIGN PATENT DOCUMENTS

DE 10 2006 049 602 4/2008

*Primary Examiner* — Cabrena Holecek
(74) *Attorney, Agent, or Firm* — Millen White Zelano & Branigan, PC; Brion P. Heaney

(57) ABSTRACT

A process and an apparatus for regenerating the loaded scrubbing medium in a physical gas scrub in which at least materials of a first type and a second type are scrubbed out of a gas mixture, where predominantly materials of the first type are separated off from scrubbing medium loaded with materials of the first type and the second type by stripping at elevated pressure and a loaded scrubbing medium enriched in materials of the second type and also a gas phase that is made up of the stripping gas used in stripping and the materials separated off from the loaded scrubbing medium are obtained. The loaded scrubbing medium enriched in materials of the second type by means of stripping is depressurized and subsequently fed to a separator in order to obtain a flash gas.

14 Claims, 1 Drawing Sheet

(56) References Cited

U.S. PATENT DOCUMENTS

| 6,174,348 B1* | 1/2001 | Ahmed | B01D 53/1425 |
|---|---|---|---|
| | | | 95/160 |
| 2013/0025452 A1* | 1/2013 | Weiss | B01D 53/1425 |
| | | | 95/266 |

* cited by examiner

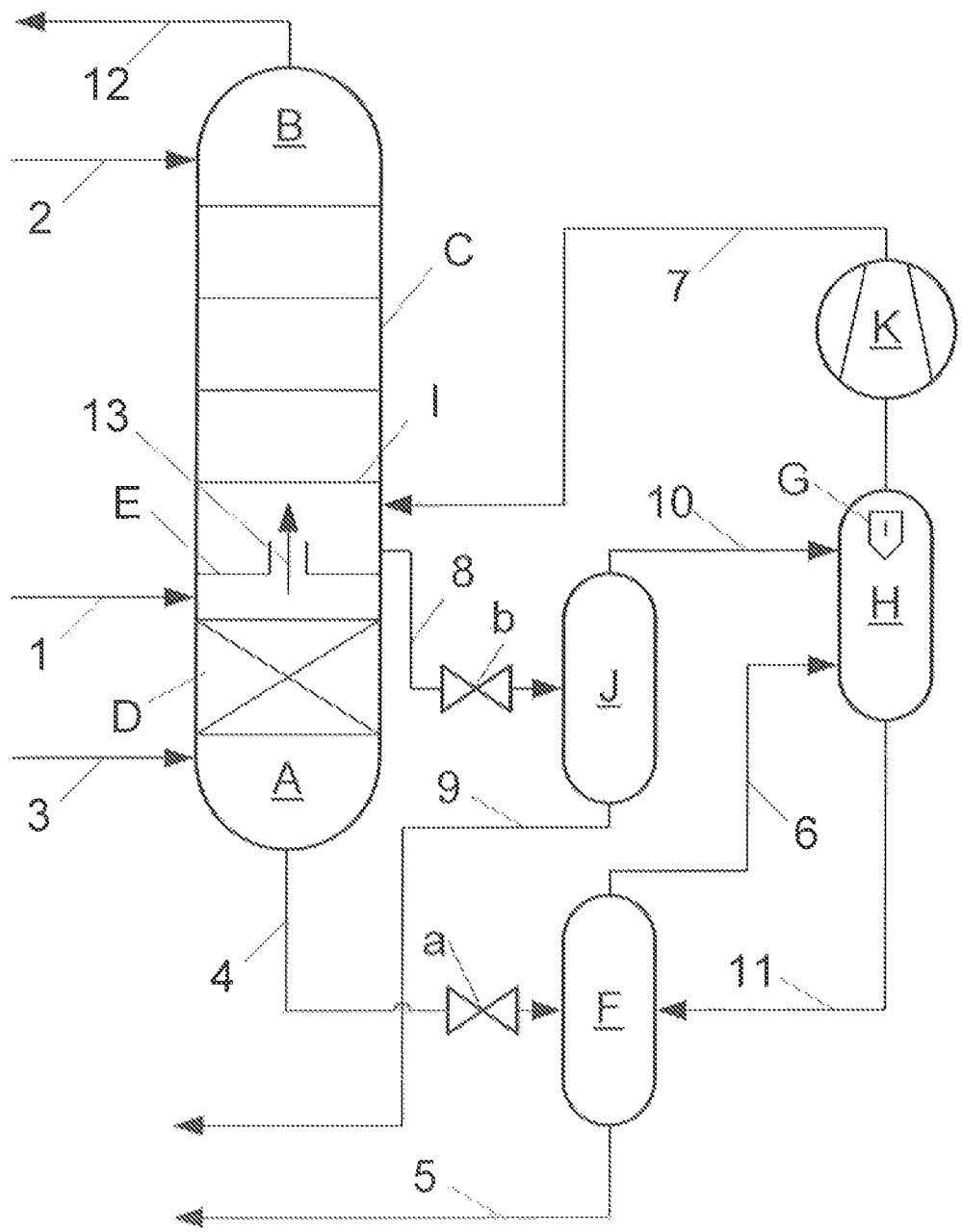

PROCESS AND APPARATUS FOR SCRUBBING MEDIUM REGENERATION IN A PHYSICAL GAS SCRUB

CROSS REFERENCE TO RELATED APPLICATION

This application claims priority from German Patent Application DE 102014018844.2 filed on Dec. 17, 2014.

BACKGROUND OF THE INVENTION

The invention relates to a process for regenerating the loaded scrubbing medium in a physical gas scrub in which at least materials of a first type and a second type are scrubbed out of a gas mixture, where predominantly materials of the first type are separated off from scrubbing medium loaded with materials of the first type and second type by stripping at elevated pressure and a loaded scrubbing medium enriched in materials of the second type and also a gas phase comprising the stripping gas used in stripping and the materials separated off from the loaded scrubbing medium are obtained.

The invention further relates to an apparatus for carrying out the process of the invention.

Physical gas scrubs are used for the separating gas components from gas mixtures. They utilize the ability of a liquid used as scrub medium to absorb gaseous materials and keep them in solution without these materials being chemically bound. How well a gas is absorbed by a liquid and bound by the latter can be expressed by its solubility coefficient, the better the gas dissolves in the liquid, the greater is its solubility coefficient. The solubility coefficient is temperature dependent and generally increases with decreasing temperature.

To remove the gas components which have been separated off from the gas mixture and dissolved in the scrubbing medium, the loaded scrubbing medium is regenerated after the gas is scrubbed. The regenerated scrubbing medium is normally reused for the gas scrub, while the gas components which have been separated off are either disposed of or passed to a profitable use.

In order to purify crude synthesis gasses, gas mixtures which are produced on an industrial scale in gasification plants from coal or/and hydrocarbon-containing feeds, for example by reforming by means of steam or by partial oxidation and generally contain not only the desired materials hydrogen ($H_2$) and carbon monoxide (CO) but also some undesirable constituents such as carbon dioxide ($CO_2$) and the sulfur components hydrogen sulfide ($H_2S$) and carbon oxide sulfide (COS), preference is given to using physical gas scrubs. These processes are attractive since the crude synthesis gasses are nowadays usually produced under high pressure and the effectiveness of physical gas scrubs increase, to a first approximation, linearly with the operating pressure. The methanol scrub is of particular importance for the purification of crude synthesis gasses. It makes use of the fact that the solubility coefficients of $H_2S$, COS and $CO_2$ in methanol differ greatly from those of $H_2$ and CO. Since these differences increase and the $H_2$ and CO losses by co-absorption thus decrease with decreasing temperature, but especially because the solubility coefficient of $CO_2$ increases greatly with decreasing temperature, the methanol scrubbing medium is usually introduced at a temperature far below 0° C. into a scrubbing column and brought into intimate contact with the crude synthesis gas to be purified. In addition, this process allows independent isolation of sulfur components and of carbon dioxide since the sulfur components have considerably greater solubility coefficients than carbon dioxide and can therefore be separated off largely selectively from the loaded methanol scrubbing medium.

If production of a hydrogen product is a primary objective, the crude synthesis gas is usually subjected to a water gas shift, in which the carbon monoxide present in the crude synthesis gas is reacted with water to form hydrogen and carbon dioxide, before the methanol scrub. Particularly when the crude synthesis gas is obtained from a low-hydrogen feed such as coal or heavy oil and therefore has a high $CO_2$ content even before the water gas shift, the $CO_2$ content can increase to more than 40 mol % after the water gas shift. In order to improve the economics of hydrogen production, a by-product which, for example, with a purity of more than 98 mol % can be used for the synthesis of urea is frequently isolated from the carbon dioxide which is formed in large quantities.

To obtain the $CO_2$ by-product, methanol scrubbing medium loaded with carbon dioxide and also the more soluble sulfur components which are therefore more strongly bound to the scrubbing medium is, according to the prior art, depressurized to a moderate pressure in the lower part of a $CO_2$ product column configured as scrubbing column. Owing to the pressure reduction, predominantly $CO_2$ but also part of the sulfur components outgas from the loaded methanol scrubbing medium and are conveyed upward in the scrubbing column. The sulfur components are scrubbed out of the gas stream by means of a sulfur-free methanol scrubbing medium which for this purpose is introduced at the top of the $CO_2$ product column and is brought into intimate contact with the ascending gas stream, A $CO_2$ stream having product purity is take off from the top of the $CO_2$ product column while a methanol scrubbing medium which has a greatly reduced $CO_2$ content but is still loaded with $CO_2$ and the sulfur components accumulates in the lower region of the column.

The methanol scrubbing medium which is still loaded with carbon dioxide and sulfur components is taken off from the $CO_2$ product column and introduced into an enrichment column which is a cold stripping column. In the enrichment column, predominantly $CO_2$ is stripped from the methanol scrubbing medium by means of a stripping gas, usually nitrogen, conveyed in counter current, so that a carbon dioxide-rich gas phase which despite being contaminated with stripping gas often has, after backscrubbing of the sulfur components present, a $CO_2$ purity which allows it to be passed on as $CO_2$ product can be taken off from the top of the enrichment column.

The methanol scrubbing medium which after stripping is loaded predominantly with sulfur components but also with a residual amount of $CO_2$ is taken off from the enrichment column and conveyed to hot regeneration [in which a methanol fraction of scrubbing medium purity and a gas fraction containing sulfur components (sour gas fraction),] the $CO_2$ content of which is determined mainly by the $CO_2$ content of the loaded methanol scrubbing medium achieved in the enrichment column, are produced. Since the sulfur present therein is a raw material which is prized in the industry, the sour gas fraction has economic potential. In order to realize this potential, the sulfur components present in the sour gas fraction are usually converted in a Claus process into elemental sulfur, but if this is to be possible the $CO_2$ content of the sour gas fraction must not exceed a limit value.

Particularly when the crude synthesis gas to be purified has a low sulfur content, as is the case, for example, for crude synthesis gas produced by gasification of low-sulfur coal, this limit value can only be achieved, if at all, with a great outlay, e.g. by cold stripping with an increased amount of stripping gas. However, if the carbon dioxide-rich gas phase obtained contaminated with stripping gas during stripping is to be passed on as $CO_2$ product, only a limited increase in the amount of stripping gas is possible because of the required product purity.

In the patent application DE102006049602, the disclosure content of which is incorporated in full into the description by reference, the loaded scrubbing medium is, after cold stripping, taken off from the enrichment column, warmed and subsequently subjected to warm stripping, in which the $CO_2$ content of the loaded scrubbing medium is reduced further and a $CO_2$-containing gas fraction is produced. The $CO_2$-containing gas fraction is subsequently recirculated to the enrichment column and goes via this into the tailgas to be discarded.

However, to achieve economical synthesis gas production, it is critical for the carbon dioxide to be separated off very completely from the loaded methanol scrub medium not only with a small outlay but also to be converted with a high percentage and appropriate purity into a $CO_2$ product.

It is therefore an object of the present invention to provide a process of the type mentioned at the outset and also an apparatus for carrying out the process which allow the disadvantages of the prior art to be overcome.

SUMMARY OF THE INVENTION

This object is achieved according to the invention in terms of the process by the loaded scrubbing medium which has been enriched in materials of the second type by stripping being depressurized and subsequently fed to a separator in order to obtain a flash gas consisting predominantly of materials of the first type and also a loaded scrubbing medium which is still enriched in materials of the second type, where a product gas consisting largely of materials of the first type is produced from at least part of the flash gas and the gas phase comprising the stripping gas.

The depressurization of the loaded scrubbing medium following stripping makes it possible to achieve a required degree of enrichment in materials of the second type by means of an amount of stripping gas which is significantly reduced compared to the prior art. In particular, the amount of stripping gas can be reduced to such an extent that a product gas which consists largely of materials of the first type and whose stripping gas content does not exceed a predetermined maximum value can be produced from flash gas and the gas phase containing the stripping gas even without stripping gas being separated off.

In order to produce a product gas consisting largely of materials of the first type from at least part of the flash gas and the gas phase comprising the stripping gas, it is proposed that the two gas phases be combined without further treatment to form the product gas. However, it is also possible to separate off materials of the second type from one of the two gas phases, for instance by scrubbing with a second scrubbing medium which is at least largely free of materials of the second type, and combine the resulting gas phase with the untreated gas phase. If both gas phases are subjected to a treatment before being combined, they can be treated together or separately. While in the case of joint treatment, the product gas consisting largely of materials of the first type is formed directly, in the case of separate treatment it is formed by combining the two gas phases which have been freed of materials of the second type.

If one of the gas phases or both gas phases is/are subjected to a scrub to separate off materials of the second type, materials of the first type are generally also absorbed by the second scrubbing medium used here, so that a second scrubbing medium loaded with materials of the first type and the second type is obtained. In order to transfer the absorbed materials of the first type into the product gas, it is proposed that the second loaded scrubbing medium be depressurized and subsequently fed to a separator in order to obtain a second flash gas consisting predominantly of materials of the first type and also a second loaded scrubbing medium enriched in materials of the second type. Preference is given to at least part of the second flash gas also being used for producing the product gas.

The second scrubbing medium is advantageously taken from the scrubbing medium circuit of the physical gas scrub. In this case, it is possible to subject the two loaded scrubbing media which are further enriched in materials of the second type jointly to one or more further regeneration steps in order to separate off the materials of the second type.

The physical gas scrub is preferably a methanol scrub in which carbon dioxide as materials of the first type and sulfur components such as $H_2S$ and/or COS as materials of the second type are washed out of a gas mixture, for example a crude synthesis gas, by means of low-temperature methanol. Nitrogen is advantageously used here as stripping gas for concentrating the sulfur components, so that a gas phase consisting predominantly of carbon dioxide and containing sulfur components and nitrogen is formed. In order to separate off sulfur components from this gas phase and also from the flash gas formed in the depressurization according to the invention, these gas mixtures are preferably subjected to scrubbing with at least largely sulfur-free methanol.

The invention further provides an apparatus for regenerating the scrubbing medium loaded at least with materials of a first type and a second type in a physical gas scrub, which comprises a stripping device in which predominantly materials of the first type can be separated of from scrubbing medium loaded with materials of the first type and the second type by stripping with a stripping gas at elevated pressure to give a loaded scrubbing medium enriched in materials of the second type.

According to the invention, the stated object is achieved in terms of the apparatus by the stripping device being connected to a depressurization device by means of which loaded scrubbing medium enriched in materials of the second type in the stripping device can be depressurized and subsequently fed to a separator, where both the stripping device and the separator are connected to a production device by means of which a product gas consisting predominantly of materials of the first type can be produced from the gas phases obtainable in the separator and the stripping device.

The production device preferably comprises a scrubbing apparatus which is connected hydrodynamically to the stripping device and/or to the separator so that the gas phases obtainable in the stripping device and/or in the separator can be fed to it for scrubbing with a scrubbing medium in order to separate off materials of the second type. The production device particularly preferably comprises precisely one scrubbing apparatus to which the two gas phases can be fed together in order to separate off materials of the second type.

In its simplest form, the production device can consist of a pipe which is connected both to the stripping device and to the separator, in which the gas phases obtainable in the stripping device and the separator can mix without further treatment to form the product gas.

BRIEF DESCRIPTION OF THE DRAWINGS

The invention is illustrated below with the aid of a working example shown schematically in the FIGURE.

DETAILED DESCRIPTION OF THE INVENTION

The FIGURE shows a section of the regeneration part of a methanol scrub, in which scrubbing medium loaded with carbon dioxide and sulfur components is regenerated.

Methanol which has been loaded with carbon dioxide and sulfur components in the scrubbing of crude synthesis gas is introduced via the lines 1 into the stripping device A which is arranged in the column C and in which part of the carbon dioxide present in the loaded methanol 1 is stripped out at a pressure of about 2.5 bar. In the stripping device A, which is provided with a structured packing D, nitrogen which is fed in via line 3 is used as stripping gas. While the gas phase 13 which consists predominantly of stripped-out carbon dioxide and nitrogen but also contains sulfur components is conveyed further via the chimney tray E into the upper part B, which is configured as scrubbing device, of the column C, methanol which has an increased sulfur content but has a carbon dioxide content which is still so high that separating of the sulfur components would give a sour gas fraction which, owing to its carbon dioxide content, would not be suitable as feed gas for sulfur production leaves the stripping device A via line 4 and is depressurized by means of the throttle device a to a pressure of about 1.2 bar and into the first separator F. In the depressurization, mainly carbon dioxide goes over into the gas phase, so that a methanol scrubbing medium 5 which has a further increased sulfur content and a carbon dioxide-rich gas fraction 6 are obtained. While the methanol scrubbing medium 5 is conveyed to isolation of sulfur (not shown), the carbon dioxide-rich gas fraction 6 is conveyed into the second separator H provided with a droplet precipitator G.

At the top of the column C, a second methanol stream 2 which is loaded with carbon dioxide but is largely free of sulfur components is introduced as scrubbing medium into the scrubbing device B where it is brought into contact with gas 7 and 13 which contains sulfur components and flows downward over mass transfer trays I and is thus conveyed in counter current. Methanol which is loaded with scrubbed-out sulfur components and has a carbon dioxide content which is likewise so high that separating of the sulfur components would give a sour gas fraction which owing to its carbon dioxide content would not be suitable as feed gas for sulfur production collects in the chimney tray E. The loaded methanol is therefore taken off from the chimney tray E via line 8 and is depressurized by means of the throttle device b to a pressure of about 1.2 bar and into the third separator J. In the depressurization, mainly carbon dioxide goes over into the gas phase so that a methanol 9 having a further increased sulfur content and a carbon dioxide-rich gas fraction 10 are obtained. While the methanol 9 is conveyed to sulfur isolation (not shown), the carbon dioxide-rich gas fraction 10 is likewise passed on to the second separator H.

The liquid phase 11 obtained in the second separator H is conveyed via the first separator F to sulfur isolation. The gas phase 7 which consists predominantly of carbon dioxide and contains sulfur components, on the other hand, is conveyed via the compressor K into the scrubbing device B in order to be freed of sulfur components together with the gas phase 13 containing the stripping gas 3. The depressurization a of the methanol 4 which has an increased sulfur content as a result of stripping makes it possible to reduce the amount of stripping nitrogen 3 compared to the prior art, so that a carbon dioxide stream 12 which, owing to its low nitrogen content, can be passed on as carbon dioxide product at the battery limits can be taken of at the top of the stripping device C.

What we claim is:

1. A process for regenerating a loaded scrubbing medium obtained from a physical gas scrub wherein at least materials of a first type and a second type are scrubbed out of a gas mixture, said process comprising:
    separating off predominantly materials of the first type from the scrubbing medium containing materials of the first type and the second type by stripping with a stripping gas thereby producing a scrubbing medium enriched in materials of the second type and a gas phase comprising the stripping gas and the materials of the first type separated from the loaded scrubbing medium,
    depressurizing the scrubbing medium containing materials of the second type and subsequently feeding the scrubbing medium containing materials of the second type to a first separator to form a flash gas containing materials of the first type and scrubbing medium enriched in materials of the second type, and
    forming a product gas containing materials of the first type from at least part of the flash gas and at least part of the gas phase comprising the stripping gas,
    wherein nitrogen is used as said stripping gas, said materials of the first type comprise $CO_2$ and said materials of the second type comprise $H_2S$ and/or COS.

2. The process according to claim 1, further comprising separating materials of the second type from at least one part of the flash gas to form a treated gas phase and combining said treated gas phase with at least part of the gas phase comprising the stripping gas to form the product gas.

3. The process according to claim 1, further comprising subjecting the at least part of the flash gas and the gas phase comprising the stripping gas separately to a treatment in which materials of the second type are separated off to produce treated gas phases and combining said treated gas phases to form said product gas.

4. The process according to claim 1, wherein the physical gas scrub is a methanol scrub in which carbon dioxide as materials of the first type and $H_2S$ and/or COS as materials of the second type are scrubbed out of a crude synthesis gas by methanol.

5. The process according to claim 1, further comprising separating materials of the second type from at least part of the gas phase comprising the stripping gas to form a treated gas phase and combining said treated gas phase with at least part of the flash gas to form the product gas.

6. The process according to claim 1, further comprising subjecting the at least part of the flash gas and the gas phase comprising the stripping gas together to a treatment in which materials of the second type are separated off to produce said product gas.

7. The process according to claim 1, wherein the separating off of the materials of the first type from the scrubbing medium is performed in a stripping device provided with a structured packing and having a first inlet for introduction of the loaded scrubbing medium and a second inlet, located below the first inlet, for the introduction of the stripping gas, said stripping device being positioned within a column and wherein said scrubbing medium enriched in materials of the second type is removed from the bottom of the column and the gas phase comprising the stripping gas and the materials of the first type is removed from the top of the stripping device.

8. The process according to claim 7, further comprising subjecting the gas phase comprising the stripping gas and the materials of the first type to scrubbing in a scrubbing device, said scrubbing device having a first inlet for introduction the gas phase comprising the stripping gas and the materials of the first type, a second inlet for introduction of a further scrubbing medium, a first outlet for removal of treated gas phase comprising the stripping gas and the materials of the first type, and a second outlet for removal of the further scrubbing medium.

9. The process according to claim 8, wherein said scrubbing device is located in said column, and said stripping device and scrubbing device are separated from each other in the column by a chimney tray, wherein the gas phase comprising the stripping gas and the materials of the first type passes from said stripping device into said scrubbing device through said chimney tray.

10. The process according to claim 9, further comprising depressurizing the further scrubbing medium removed from the scrubbing device and introducing depressurized further scrubbing medium into a further separator wherein a gas fraction is removed from the top of the second separator.

11. The process according to claim 9, wherein the flash gas containing materials of the first type is sent to a second separator provided with a droplet precipitator and a first gas fraction containing materials of the first type is removed from the top of the second separator.

12. The process according to claim 11, further comprising depressurizing the further scrubbing medium removed from the scrubbing device and introducing depressurized further scrubbing medium into a third separator wherein a second gas fraction is removed from the top of the third separator.

13. The process according to claim 12, further comprising introducing said second gas fraction into said second separator, compressing said first gas fraction, introducing compressed first gas fraction into the lower part of said scrubbing device, and removing said product gas from the top of said column.

14. A process for regenerating a loaded scrubbing medium obtained from a physical gas scrub wherein at least materials of a first type and a second type are scrubbed out of a gas mixture, said process comprising:
(a) separating off predominantly materials of the first type from the scrubbing medium containing materials of the first type and the second type by stripping with a stripping gas thereby producing a scrubbing medium enriched in materials of the second type and a gas phase comprising the stripping gas and the materials of the first type separated from the loaded scrubbing medium,
wherein said materials of the first type comprise $CO_2$ and said materials of the second type comprise $H_2S$ and/or COS,
wherein the separating off of the materials of the first type from the scrubbing medium is performed in a stripping device provided with a structured packing and having a first inlet for introduction of the loaded scrubbing medium and a second inlet, located below the first inlet, for the introduction of the stripping gas, said stripping device being positioned within a column and wherein said scrubbing medium enriched in materials of the second type is removed from the bottom of the column and the gas phase comprising the stripping gas and the materials of the first type is removed from the top of the stripping device,
(b) subjecting the gas phase comprising the stripping gas and the materials of the first type to scrubbing in a scrubbing device, said scrubbing device having a first inlet for introduction the gas phase comprising the stripping gas and the materials of the first type, a second inlet for introduction of a further scrubbing medium, a first outlet for removal of treated gas phase comprising the stripping gas and the materials of the first type, and a second outlet for removal of the further scrubbing medium,
wherein said scrubbing device is located in said column, and said stripping device and scrubbing device are separated from each other in the column by a chimney tray, wherein the gas phase comprising the stripping gas and the materials of the first type passes from said stripping device into said scrubbing device through said chimney tray
(c) depressurizing the scrubbing medium containing materials of the second type and subsequently feeding the scrubbing medium containing materials of the second type to a first separator to form a flash gas containing materials of the first type and scrubbing medium enriched in materials of the second type, and
(d) forming a product gas containing materials of the first type from at least part of the flash gas and at least part of the gas phase comprising the stripping gas.

* * * * *